United States Patent [19]

Haunschild

[11] Patent Number: 5,090,637

[45] Date of Patent: Feb. 25, 1992

[54] HELIUM PURIFICATION SYSTEM FOR LIGHTER-THAN-AIR AIRCRAFT

[76] Inventor: Willard M. Haunschild, 804 Cedar Ave., Tillamook, Oreg. 97141

[21] Appl. No.: 338,179

[22] Filed: Apr. 14, 1989

[51] Int. Cl.[5] .............................................. B64B 1/58
[52] U.S. Cl. ...................................... 244/97; 244/24; 244/30; 244/134 R
[58] Field of Search ....................... 244/97, 29, 24, 30, 244/134 R, 94

[56] References Cited

U.S. PATENT DOCUMENTS

| | | | |
|---|---|---|---|
| 3,346,216 | 10/1967 | Desmarteau | 244/29 |
| 3,897,032 | 7/1975 | Papst | 244/96 |
| 4,685,640 | 8/1987 | Warrington et al. | 244/29 |
| 4,773,617 | 9/1988 | McCampbell | 244/24 |

Primary Examiner—Charles T. Jordan
Assistant Examiner—Rochelle Lieberman
Attorney, Agent, or Firm—Burns, Doane, Swecker & Mathis

[57] ABSTRACT

A helium purification system for use with lighter-that-air airships has a catalytic purification stage for removing oxygen from the lift gas, and if desired, a nitrogen removal stage. Impure lift gas is passed through the catalytic purification stage which includes catalytic means for reacting hydrogen and contaminating oxygen entrained in the lift gas to form water and liberate heat energy. The catalytic reaction of oxygen and hydrogen increases the lift capacity of the airship both by removing oxygen from the lift gas which can then be replaced with additional lift gas and by heating the lift gas. The lifht weight catalytic purifier requiring no external power makes practical an on-board lift gas purifier to scavenge oxygen from the lift gas as soon as it enters the aerostat whose only cost of operation is that of the hydrogen consumed. Hydrogen gas may be added in approximate stoichiometric proportion to react with oxygen in the lift gas, but preferably hydrogen is maintained as a component of the lift gas at a concentration of up to the flammable limit of about 14% of the total lift gas to increase the lift capacity of the airship. Heat from the catalytic reaction of oxygen and hydrogen is also used to de-ice the aerostat surface by directing such heated gas leaving the catalytic purifier over the inner surface of the aerostat fabric along the top of the aerostat. The airship empennage are may also be de-iced by separate catalytic reactors located in the empennage. The liberated heat may then be heat exchanged with air for circulation throughout the empennage surface and over the hinged or pivot connections between the movable and stationary parts of the empennage. A nitrogen removal stage, utilizing a semi-permeable membrane purifier or an absorption purifier means removes both nitrogen and oxygen from the lift gas, either before, or after, catalytic purification of the lift gas. For land-based purification systems, prior removal of air components is preferred to reduce the amount of heat generated by the catalytic reaction. When the catalytic stage is placed on-board the aerostat the catalytic oxygen removal stage is decoupled from but precedes the nitrogen stage which normally will be a land-based system.

36 Claims, 5 Drawing Sheets

HELIUM PURIFICATION SYSTEM FOR LIGHTER-THAN-AIR AIRCRAFT

FIELD OF THE INVENTION

This invention relates to helium purification systems for use with airships or balloons. More specifically the invention relates to helium purification systems to remove oxygen from an airship's lift gas, wherein oxygen is removed, at least in part, by catalytic reaction with hydrogen to form water, to augment or supplement other processes for removal of nitrogen from the lift gas. More particularly, the invention relates to utilizing heat liberated by the reaction of hydrogen with oxygen to increase the buoyancy of the lift gas both by reducing the percentage of oxygen in the lift gas and to use heat so generated to augment the buoyant lift or to prevent accumulation of ice and snow by mixing the catalytically purified gas with the lift gas within the airship, either during flight or while moored and with or without nitrogen removal, either before or after such catalytic reaction to remove oxygen.

BACKGROUND OF THE INVENTION

Rigid airships (Zeppelins) and blimps in the United States have used non-flammable helium rather than hydrogen as the lifting gas because of safety concerns, such as the Hindenburg disaster of the 1930's. However, such improvement in safety came at a substantial penalty in performance.

For example, the hydrogen-filled Zeppelins of the 1920's and 1930's regularly flew across the Atlantic from Friedrickshafen, Germany to Lakehurst, N.J. and Rio de Janeiro, Brazil. However, none of the helium-filled ships of this era had sufficient range for transoceanic flight. The German airship LZ-126 flew the 5,000 miles from Friedrickshafen to Lakehurst as a hydrogen ship. Renamed the Los Angeles and converted to helium by the U.S. Navy it could not make the 3,800 mile return flight to England, from Lakehurst to Cardington.

The inferior performance of helium-filled airships as compared to those using hydrogen as the lift gas is the result of three major factors. First, helium is simply less buoyant than hydrogen. At standard atmospheric conditions the buoyancy of hydrogen and helium are 71.2 and 66.0 pounds per thousand cubic feet, respectively: Thus the gross lift of a ship filled with hydrogen would be 8% more than if the same ship were filled with helium. The gain of net lift available for payload and fuel would be as much as 16%.

Second, and more importantly, the much higher cost of helium precludes routine valving off or venting lift gas during flight. Hydrogen airships were essentially completely (95%) filled with hydrogen gas for maximum lift at take off. Gas was then valved off during flight to maintain neutral buoyancy as fuel was consumed and to handle expansion of the gas due to increased altitude and decreased ambient pressure.

Helium ships by contrast were only 80-85% full at take-off to allow room for expansion of the helium caused by changes in altitude and temperature. Neutral buoyancy was maintained by condensing water from engine exhaust to offset the weight of fuel consumed. Since the helium airships were only partially full of lift gas at take-off such airships could not carry as much payload or fuel as hydrogen ships of the same size. The weight of the water recovery system and its fuel requirement further decreased the net pay load of helium airships.

Finally, the practical purity of helium lifting gas is less than that of hydrogen. Non-rigid airships are normally formed of fabric joined or seamed to form an aerostat when inflated with a lift gas, helium or hydrogen, at a slight positive pressure relative to the ambient air. Pressure of the airship is then controlled by internal air bags known as ballonets. Air is introduced or expelled from the ballonets to compensate for variations in the volume of the lift gas and thus maintains at all times a positive pressure on the aerostat, and its aerodynamic characteristics.

A particular operational problem with helium-filled airships and balloons is that their lift gas gradually becomes contaminated with air through leaks in the ballonet fabric or seals and by diffusion through (or punctures of) the main aerostat and ballonet fabrics. Thus, in normal operation, the helium lift gas in a helium airship gradually becomes contaminated with heavier oxygen and nitrogen, whereas with hydrogen filled airships the valving off of a substantial fraction of its lift gas during each flight and its replacement with pure hydrogen before the next flight kept air contamination to a very low level.

Typically in World War II blimps, the helium purity declined to less than 95% in about six months. At about this point the blimp had lost a substantial fraction of its gross lift and a much larger percentage of its net payload and it had to put into a maintenance base for helium replacement. At the base the ship was purged with purified helium to increase the purity up to 98 to 99%. The contaminated helium was purified and stored in high pressure cylinders for reuse. Smaller mobile purifiers were also developed which could withdraw a stream of contaminated helium, remove the impurities, and return the purified helium to the ship without intermediate storage. These units could purify the helium while the ship was in a hangar or moored to an external mast. On-board purifiers were not practical because of their weight and because continuous purification was not necessary or even desirable from an operational standpoint.

Helium may be purified in several other ways, including cryogenic distillation. In cryogenic distillation, everything other than helium is liquified or solidified and separated from the remaining helium gas. Low temperature adsorption on activated carbon was widely used by the Navy in World War II and is still used by some operators of advertising blimps.

More modern processes include the use of semipermeable membranes and selective adsorption on molecular sieves to separate contaminants from the helium.

Semi-permeable membrane processes take advantage of the fact that helium passes through or permeates certain membranes many times faster than oxygen or nitrogen. In molecular sieve processes impurities are selectively adsorbed from helium in a manner similar to activated carbon, but at normal temperatures rather than the low temperatures required by the activated carbon methods. Both semi-permeable membrane and molecular sieve adsorption methods remove oxygen less efficiently than nitrogen.

It is accordingly a primary object of this invention to remove oxygen by a very efficient catalytic reaction process, thus substantially improving the efficiency of the overall helium purification process for either rigid or non-rigid airships or balloons.

During the 1950's the Navy developed heavy take-off techniques for its big blimps which took advantage of the aerodynamic lift generated by the envelope as the ship took off from a runway with a nose-up attitude. This allowed the Navy ZPG class airships to take off say 10,500 pounds heavy, something never attempted with the much longer rigid Zeppelins. This allowed the airships to take off with more fuel and greatly extended their range. However this technique requires take-off from a paved runway under favorable weather conditions and would not be applicable to routine refueling at sea or at unimproved land sites.

A further object of this invention is to temporarily increase the volume of helium by increasing its temperature to provide maximum lift when needed; for example, at take-off, or for special maximum-lift missions, without need of either such a paved runway or such favorable weather conditions. Particular advantage is taken of the fact that helium volume is directly proportional to its absolute temperature. For example, at 60° F. (520° R.) an increase in temperature of 52° F. would increase the helium volume by 10%. This concept of heating or cooling the helium to cause it to expand or contract is known as "thermal buoyancy control" or a "thermal ballonet".

As airships gain altitude during flight the pressure decreases and the helium volume increases. In non-rigid blimp-type airships the increase in volume of helium is accommodated by venting air from a ballonet, a separate air compartment, so that the combined volume of helium plus air is always equal to the total volume of the aerostat. When all of the air has been released from the ballonet the airship is completely full of helium and the ship is at its pressure height. This is the maximum height that a blimp can reach and safely return to earth.

Typically a military blimp might have a ballonet volume equal to 30% of the main aerostat, giving it a pressure height of about 10,000 feet. If it goes above its pressure height to 15,000 feet, for example, the crew must valve off the additional volume of helium corresponding to the decrease in pressure between 10,000 and 15,000 feet (13%). This causes no immediate problem provided that the ship has ballast to release to compensate for the reduction in lift or can generate aerodynamic lift. However, when the ship returns to earth the process is reversed. As the helium volume decreases, air is blown into the ballonet to keep a small positive pressure of about two inches of water on the aerostat. The positive internal pressure keeps the aerostat fabric taut and maintains the aerodynamic shape of the aerostat necessary for smooth flow and minimum drag of the ship through the air.

As the descent continues, the ship having valved off a portion of its initial helium volume arrives at an elevation at which the ballonet is completely full of air and can not compensate for any further decrease in helium volume. If the descent continued, the pressure in the aerostat would fall below the surrounding air pressure, a dimple would form in the front of the aerostat, so that the aerodynamic drag would be greatly increased and the ship would be in grave danger under anything less than ideal weather conditions.

In accordance with the present invention, such a problem is overcome by heating the helium in the aerostat to increase its volume, thereby staying within the operational control range of the fixed volume ballonet. Accordingly another object of this invention is to extend the operating range of an airship to higher altitudes than would be permitted by its ballonet volume by providing additional volume compensation through the effect of temperature on lift gas volume.

Another problem associated with airships and balloons is that of snow and ice accumulation on the aerostat and control surfaces. Such aircraft are especially vulnerable because of their large surface area. For example, a quarter-inch of ice on a 30,000 square foot surface would add to more than eighteen tons of ice.

Known in-flight measures to cope with icing conditions include cycling the pressure of the airship above and below its normal pressure to convert the whole aerostat into a de-icing boot and constant exercising of the control surfaces to keep them from freezing up. Otherwise the standard operating procedure is to get into a hangar, if possible, and if not, to get airborne and seek an altitude above or below the icing or wet snow conditions. Accordingly the present invention provides methods and apparatus for substantially improving safety and operability of such airships or balloons under icing conditions either during flight or while moored.

A further object of this invention is to provide means either on board, or at mooring, to warm the helium quickly to warm the aerostat and control surfaces and thereby prevent the accumulation of ice or wet snow on the aerostat surfaces.

SUMMARY OF THE INVENTION

Pursuant to the present invention a helium purification system for use with airships having helium as the primary lifting gas has a catalytic reaction stage in which oxygen reacts with hydrogen to form water according to the following chemical reaction equations:

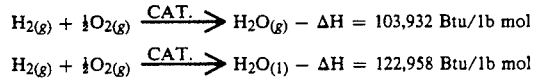

$$H_{2(g)} + \tfrac{1}{2}O_{2(g)} \xrightarrow{CAT.} H_2O_{(g)} - \Delta H = 103,932 \text{ Btu/lb mol}$$

$$H_{2(g)} + \tfrac{1}{2}O_{2(g)} \xrightarrow{CAT.} H_2O_{(l)} - \Delta H = 122,958 \text{ Btu/lb mol}$$

The reaction is highly exothermic and liberates 103,932 Btu per lb mol of water formed, if the water remains in the vapor state, and 122,958 Btu per lb mol if the water is condensed to the liquid state.

The catalytic stage utilizes a catalytic surface to react hydrogen and oxygen entrained in the lift gas to form water and to liberate a large amount of heat which increases the temperature of the gases leaving the purifier. The water condenses in the air ship and can be drained off. The catalytic reaction can be controlled to remove substantially all of the oxygen contaminating the lift gas. Oxygen is normally present in the lift gas as a contaminant but may also be added to form a catalytically reactable mixture when necessary to replenish the oxygen consumed. Hydrogen for the catalytic reaction may be mixed with helium lift gas in the aerostat up to a lower flammable limit of about 14% by volume. This would increase the gross lift capacity of the aerostat by over 1% and increase the net lift available for pay load by as much as 5% in some types of hybrid airships at less cost than by using 100% helium while still retaining the desired safety of a non-flammable lifting gas. Alternatively hydrogen may be added only when catalytic conversion is desired by adding the hydrogen in stoichiometric proportion for reaction with oxygen in the gas stream passing through the catalytic converter.

The oxygen-hydrogen catalytic reaction stage is desirably used in conjunction with other primary processes for purifying helium to: 1) provide an extremely efficient on-board purifier which scavenges oxygen from the lift gas as soon as it enters the aerostat; 2) compensate for deficiencies in such processes and thus to obtain a more efficient overall process which increases the purity of the purified helium stream and reduces the amount of helium lost with the impurities rejected by the process; 3) increase the buoyant lift by substituting, in part, more buoyant and less costly hydrogen for helium in the aerostat when desired; and 4) provide a safe method for rapidly heating helium in the aerostat when desired to increase the lift, or protect the ship from snow and ice accumulation, or to provide additional lift gas volume to make up for helium losses resulting from damage, or from mission excursions above pressure height.

Known processes for purifying helium from contaminants, particularly nitrogen and oxygen components of air, include cryogenic distillation, low-temperature adsorption on activated carbon, adsorption on molecular sieves and diffusion through semi-permeable membranes. These processes all exploit differences in physical properties of helium and its contaminants to produce a purified helium stream from which a preponderance of the impurities has been rejected. Processes for carrying out these principles are commercially available. The present invention is additionally directed to the combination of such processes with a catalytic reaction stage to remove all, or part, of the oxygen to make up for deficiencies in oxygen removal by such other processes or to provide a safe method for rapidly increasing the temperature and volume of the main body of helium in the aerostat.

A preferred embodiment of the invention is a combination process in which a primary semi-permeable membrane process is followed by the catalytic reaction process.

The primary stage may employ either a semi-permeable membrane purifier or a molecular sieve adsorption purifier to remove nitrogen entrained in the lift gas. In this case the primary semi-permeable membrane process also removes a major portion of the oxygen present in the lift gas.

In a preferred embodiment of the method, the membrane stage preferably precedes the catalytic stage to reduce the amount of oxygen that must be reacted with hydrogen. Reducing the amount of reactable oxygen in the catalytic stage helps control the produced heat to desirable levels. However, the catalytic stage may precede the membrane stage. In the latter case, substantially all of the oxygen is removed in the catalytic stage so that nitrogen remains as the principal containment to be removed from the effluent. In this latter embodiment, the catalytic oxygen removal stage would preferably be located on board the airship where it would continuously remove oxygen as soon as it enters and hence the lift gas would never contain more than trace levels of oxygen.

The present helium purification system may increase the lift capacity of an airship in several ways. In either a land-based or an on-board airship system, the purification system removes contaminants from the lift gas thereby permitting the addition of an equal volume of helium, thus increasing the buoyant lift of the airship. Also, the heat liberated by the hydrogen/oxygen reaction heats the effluent lift gases leaving the catalytic purifier and returning to the lift compartment. The increased temperature further reduces the specific gravity of the purified helium relative to the unpurified lift gas, aids stratification, and retards mixing of the purified and unpurified gases thus improving the efficiency of the purification process. As particularly used in an on-board system, the volume of helium in the lift compartment of the airship is increased because of increased temperature, thus increasing its buoyancy. Furthermore, where hydrogen is added to, or maintained in, the airship's lift compartment, the greater buoyancy of the hydrogen relative to that of helium directly increases buoyancy of the lift gas.

Also pursuant to the present invention, heat from the catalytic combination of hydrogen and oxygen may be used to de-ice the airship's surfaces. In a preferred form, heated lift gas from the catalytic purifier is directed to flow adjacent and along the top of the lift compartment to warm the lift gas by direct mixture. The aerostat fabric is thereby directly warmed to prevent eh accumulation of ice or snow. In such an application, stratification of the warm helium in the upper part of the lift compartment is highly desirable since it is the upper surface which is most susceptible to accumulation of snow and ice. Heating only the upper part of the lift gas also reduces the unavoidable increase in lift resulting from the increase in temperature as compared to that which would have occurred if the entire volume had been heated uniformly. Accordingly, such direct heating of the aerostat surface reduces the consumption of hydrogen and oxygen needed to obtain the desired protection from icing conditions.

A multiplicity of catalytic reactors may also be placed in the airship's empennage to generate heat for de-icing. In such a lift gas system, containing both hydrogen and oxygen, such gas is drawn from the aerostat through a catalytic purifier in the fins to generate large amounts of heat. The hot gas exits the catalytic reactor and exchanges heat with air in the fin to warm its surface and thereby prevent accumulation of snow or ice. Lift gas with reduced hydrogen and oxygen is then returned to the aerostat. The warm air from the fins may also be released from the fixed empennage at strategic locations to flow over the actuators, hinges and movable rudder and elevator control surfaces to keep these critical exterior elements operable under icing conditions.

In accordance with a method aspect of the present invention the lift capacity of a helium lift compartment of an airship is at least periodically increased to maintain or augment the lifting capacity of said airship by inducing flow of a portion of the helium lift gas which has entrained therein a reactable mixture of hydrogen and oxygen components through a confined path. The path has disposed for contact therein a hydrogen-oxygen catalytic reaction surface at a desirable temperature. The oxygen and hydrogen are controlled in amounts relative to the helium to substantially reduce the oxygen content and increase the temperature of the resulting gas after passing over said catalytic surface. The resulting gas is then circulated into the lift compartment in a volume or at a rate sufficient to increase the lift capacity of compartment.

Another aspect of the method of the invention is directed to at least periodically separating oxygen from a helium-air mixture in the lift compartment of a lighter-than-air airship to maintain its lifting capacity by drawing a portion of the helium-air mixture from the lift compartment through a confined flow path and adding an amount of hydrogen proportional to the oxygen content of the mixture at a rate to avoid creating a flammable mixture. The helium-hydrogen-air mixture then flows in the confined path to contact a catalytic surface to catalytically combine the hydrogen and oxygen components to form water and the resulting purified gaseous components are returned to the lift compartment.

In accordance with another method aspect of the invention, the outer surface of an airship having a helium lift compartment is deiced by inducing flow of a portion of the helium having entrained therein a reactable mixture of hydrogen and oxygen components through a confined path having a catalytic reaction surface disposed therein for contact with a mixture of hydrogen and oxygen. The mixture of oxygen and hydrogen after catalytically combining by passage over the catalytic reaction surface has a substantially increased temperature so that the resulting gas is circulated to increase the temperature of the lift gas in the lift compartment.

In accordance with another apparatus aspect of the invention, the outer surface of an airship having a helium lift compartment forming the aerostat surface of the airship may be deiced by means forming a confined flow path in the lift compartment and having disposed therein a hydrogen-oxygen catalytic reaction means for catalytically combining a mixture of hydrogen and oxygen entrained in the helium to heat the resulting gas. Flow inducing means conducts the mixture from the lift compartment through the confined flow path and then passes the effluent gas to the lift compartment for exchanging heat adjacent the surface to be deiced, which may include means for diverting the gas along the surface to be deiced.

These and other objects, advantages and features of the invention will become apparent from the following description of preferred embodiments, considered along with the accompanying drawings.

DESCRIPTION OF THE PREFERRED EMBODIMENTS

Figure 1:
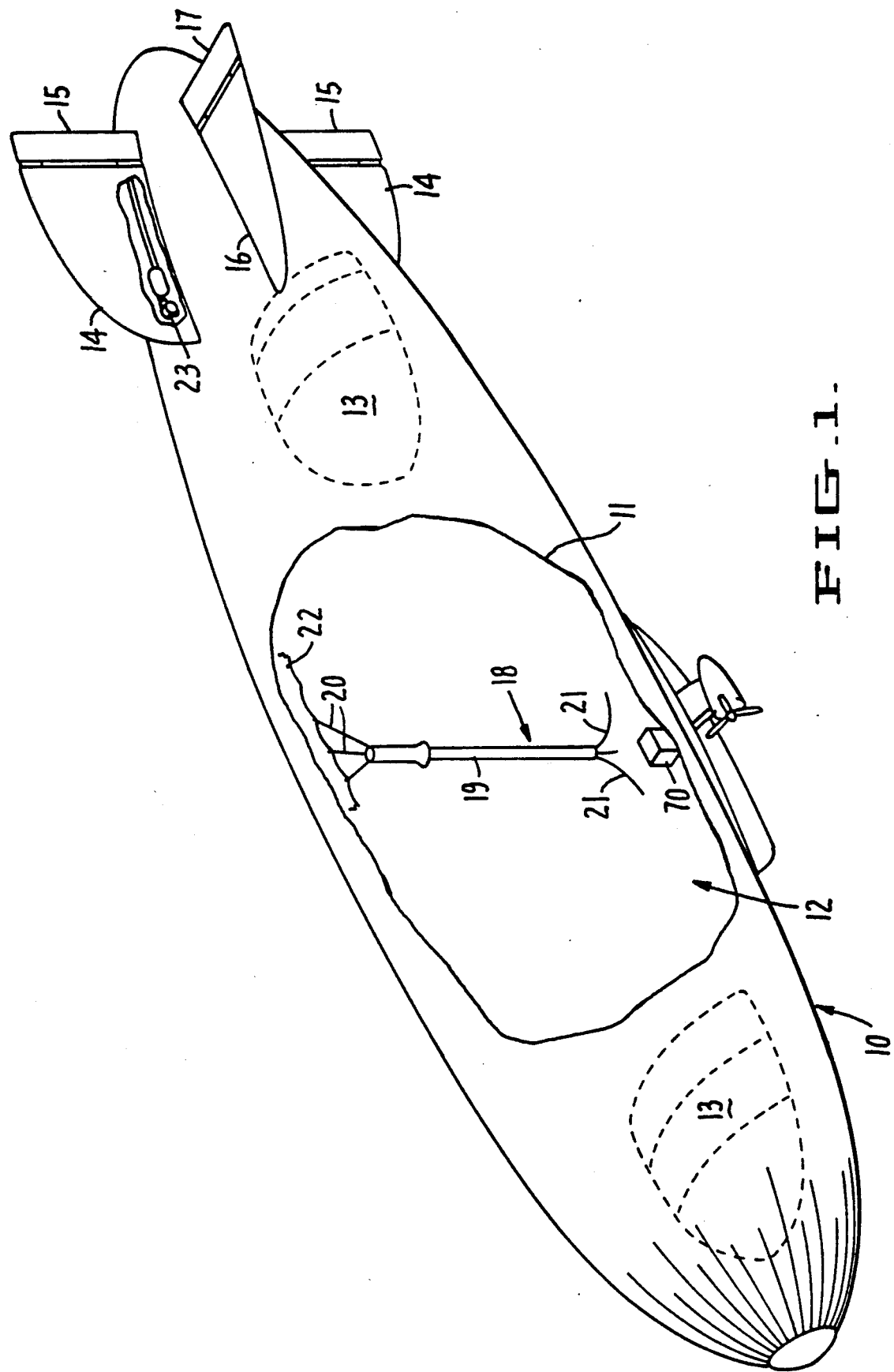
FIG. 1 is a perspective view of an airship partially cut away to show one embodiment of the present helium purification system.
Figure 5:
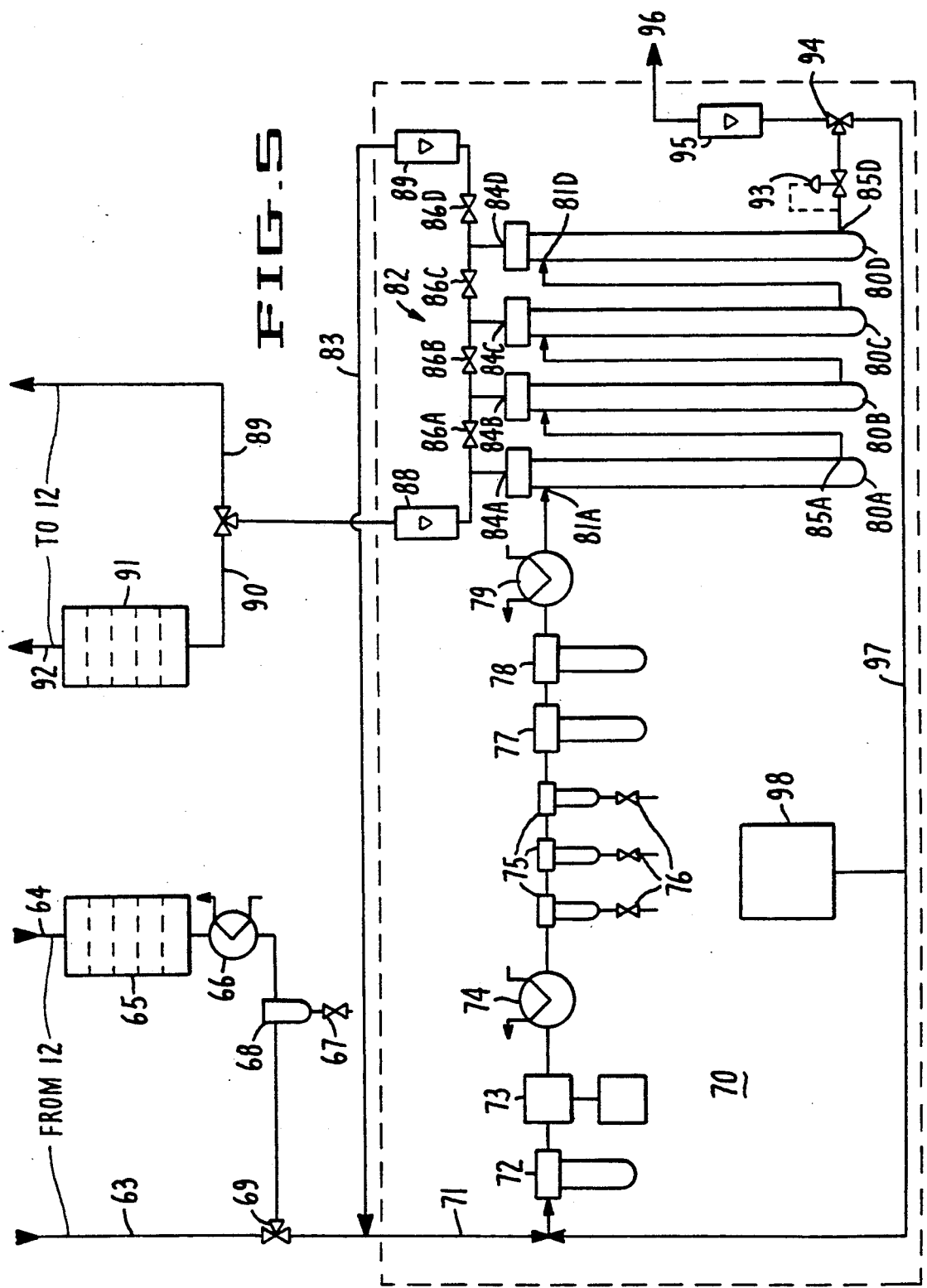
FIG. 5 is a schematic diagram of alternative embodiments of a combination of a catalytic purifier and a non-catalytic purification process using semi-permeable membranes or molecular sieves, in accordance with the present invention.

As discussed above, in accordance with the present invention, routine, or periodic, purification of helium in an airship or blimp may be most advantageously carried out in a land-based system wherein lift gas is circulated from the aerostat of an airship 10, as in FIG. 1, to a separate purification system as shown in FIG. 5. Such a system includes removal of both nitrogen and oxygen either before or after addition of hydrogen, as will be more fully described below. However, for simplicity in description of the economic advantages made possible by on-board purification of the lift gas, the embodiment illustrated in FIG. 1 will be described first. It illustrates the essential steps of the methods for increasing buoyancy of the helium either by increasing its purity, or if desired by adding thermal energy to the gas to augment such buoyancy, or to prevent ice or snow from accumulating on the surface, or any combination of the foregoing advantages.

As seen in FIG. 1, the method of the present invention may be carried out entirely within an airship, generally indicated as 10. As there shown, the aerostat surface of the airship or blimp is formed by fabric 11 generally joined or seamed to form a lift compartment 12 which normally contains helium as the primary lift gas. Pressure of the airship is then controlled by internal air bags, or ballonets 13. Ballonets 13 permit introduction of, or expulsion of air, to compensate for the variable volume of lift gas and thus to maintain at all times a slight positive pressure on the aerostat relative to the ambient air.

As discussed above, lift compartment 12 normally also contains contaminating components of oxygen and nitrogen which are introduced by air leaks from ballonet 13 or by diffusion from the atmosphere through ballonet fabric and aerostat fabric 11, or due to small punctures or holes, such as by gun fire. In accordance with the present invention, the on-board helium purification system substantially increases the operational range and lift capacity of the airship by catalytically reacting contaminating oxygen with hydrogen. In addition to increasing buoyancy by permitting additional helium to be added such reaction directly transfers heat generated by combustion of the hydrogen and oxygen, to lift gas volume.

In the arrangement of FIG. 1 it will be seen that purification system 18 may be supported by lines 20 suspended from catenary curtains 22. As indicated, catenary curtains 22 may be formed parallel to the axis of airship 10 and along the upper surfaces of compartment 12 by downwardly extending edges or seams of integral fabric 11. Other lines 20 suspended from the catenary curtains 22 generally support the cabin, power plant, fuel tanks and other equipment for operation of the airship.

Figure 2:
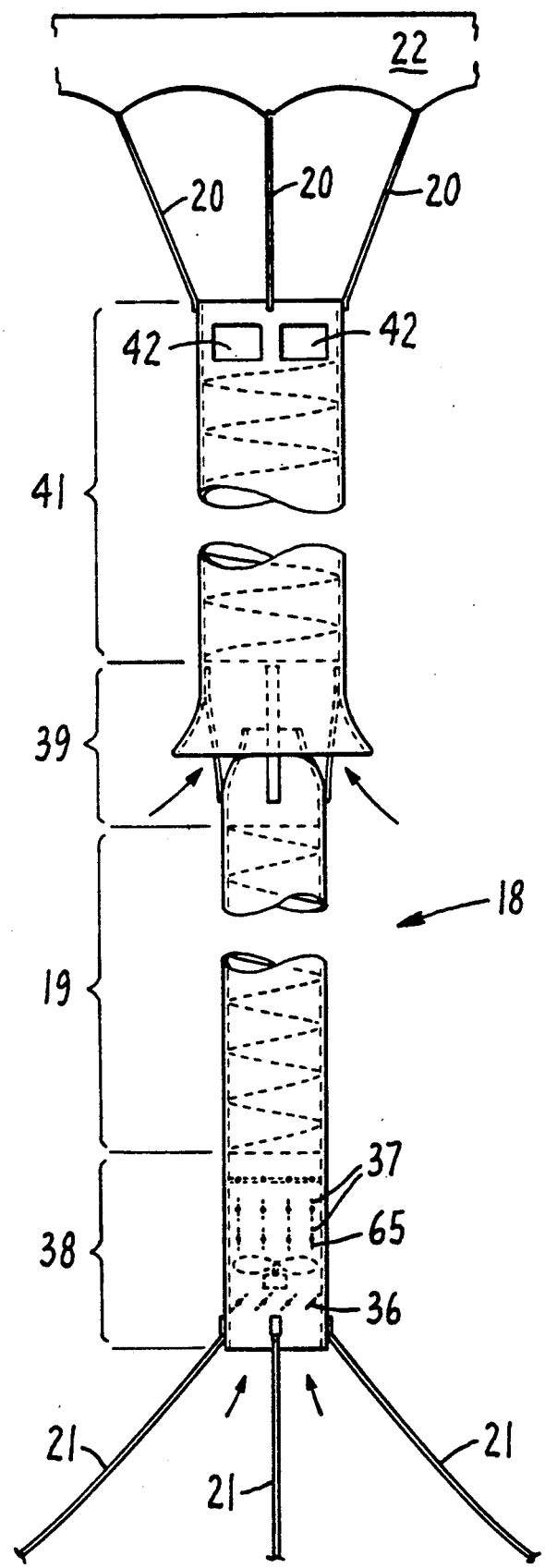
FIG. 2 is a vertical cross-sectional view of the catalytic purification apparatus in the embodiment of the present invention shown in FIG. 1.

In the present embodiment, lines 20 and tie down lines 21 support at least one vertical conduit 19. As shown in FIG. 2; conduit 19 forms a confined path in which oxygen entrained in the lift gas is converted to water vapor by contact with hydrogen either added to, or already contained in, the lift gas by passage over a catalytic conversion surface such as screens 37 of catalytic converter 38 forming a part of conduit 19. As indicated the number or gauge of such catalyst screens may be selected manually or automatically in accordance with the desired or allowable temperature of the purified gas. Where hydrogen is not a component part of the lifting gas, hydrogen is supplied to converter section 38 from a supply such as a liquified or compressed gas (not shown). However, in the preferred method of operating, hydrogen is incorporated in the lifting gas up to the flammable limit of mixtures of hydrogen and helium. Flow is preferably induced by thermal convection by the flow of the gas heated during catalytic reaction of such component hydrogen and contaminating oxygen. For initiating such flow, (before thermal convection is induced) a fan or blower may be used to induce or increase flow of hydrogen with oxygen contaminated helium from lift compartment 13. With such an on-board system the lift capacity of the airship is readily increased by removing the contaminating oxygen. At the same time, the lift gas volume is immediately increased because of its increased temperature As shown on FIG. 3B when the lift gas containing 1% oxygen is at 60° F. at the inlet to the catalytic converter, the temperature at the exit, with the oxygen having been completely reacted to form water would have risen to approximately 450° F. A diffuser designed to dilute this hot gas stream with four volumes of unreacted cold gases from the aerostat would reduce the temperature to about 138° F. Due to the potentially high temperatures of such reaction gases when hydrogen and high percentages of oxygen react, conduit section 19 (FIG. 1) is desirably formed of high temperature tolerant fabric, such as glass fiber.

FIG. 5 shows two alternate embodiments of this invention. In the first embodiment, the semi-permeable membrane purifier 70 is preceded by the catalytic purifier and the flow from lift compartment 12 is through catalytic purifier 65 on the inlet and bypasses catalytic purifier 91 in the purified helium return line to the lift compartment 12. In the second embodiment, the semi-permeable membrane purifier 70 bypasses catalytic purifier 65 and passes through catalytic purifier 91 in the purified helium return line to lift compartment 12.

In the second embodiment, the semi-permeable membrane (or molecular sieve) purifier 70 removes a preponderance of the nitrogen and oxygen contaminants and the function of the catalytic purifier is to scavenge the remaining oxygen which has passed through the primary system 70. This is the preferred embodiment for a land based system when the objective is to periodically increase the lift capacity of an airship by removing contaminants thus increasing the helium purity. In this embodiment the heat release in catalytic converter 91 is such that cooling of the purified helium is not necessary before returning it to lift compartment 12 and the modest heating which occurs is beneficial in promoting stratification of the purified and non-purified gases in lift compartment 12.

The first embodiment is preferred when the objective is either 1) to carry out the purification process on-board the aircraft, or 2) to take advantage of the heat release in the catalytic converter in a system for thermal buoyancy control or for protecting the aircraft from ice and snow.

When the objective is to carry out on-board purification, catalytic purifier 65 would preferably be decoupled from semi-permeable membrane purifier 70 so that each would be operated independently of the other. The light weight catalytic purifier would preferably be deployed on board the aircraft as shown in FIGS. 1, 2, 3 and 4 where it could be operated either to continuously scavenge oxygen from the lift gas to keep oxygen contamination down to trace levels or operated periodically to release heat when desired. The semi-permeable membrane system 70 is much heavier than the catalytic purifier and requires a large amount of power to operate the compressor which would normally make it impractical to include the semi-permeable membrane system in an on-board purification system. In this embodiment, the semi-permeable membrane system 70 would preferably be deployed as an independent, land-based system for periodically removing nitrogen from the lift gas from which oxygen has continuously been removed by the on-board catalytic purifier.

Figure 4:
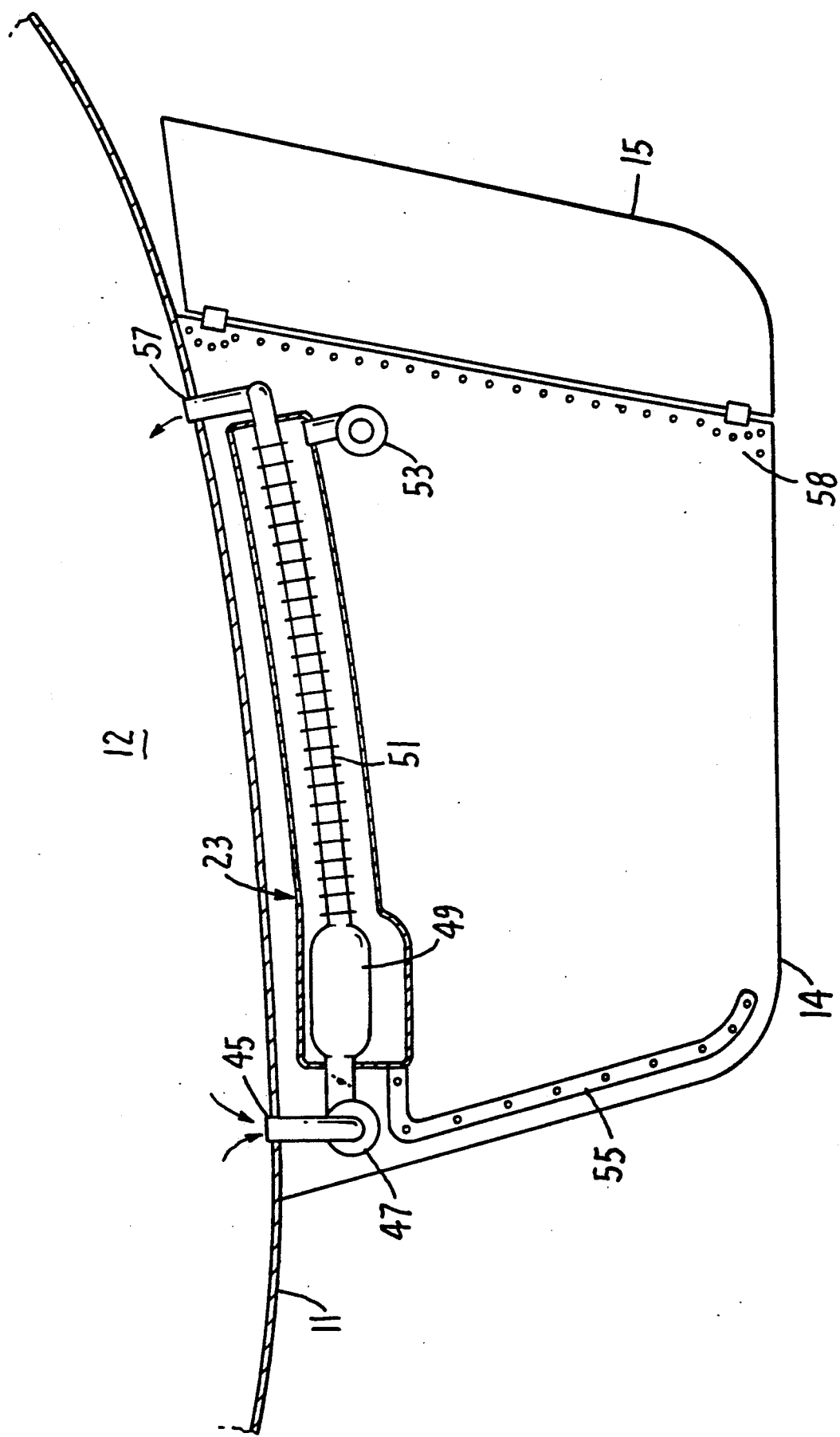
FIG. 4 is a partial schematic diagram showing an empennage deicer arrangement for the FIG. 1 embodiment of the present purification system.

As discussed more fully below, airship 10 also includes empennage members, generally indicated as fins 14 and 16 with rudders 15 and elevators 17. Because the ability to control flight requires movement of control surfaces 15 and 17, the present invention may also include means for similarly equipping each of the empennage members 14 and 16 with deicers 23 to keep their surfaces free of ice or snow. A specific embodiment of the arrangement for so heating the empennage surfaces is shown in FIG. 4 and described more fully below.

A complete embodiment of an on-board catalytic purifier system 18 is illustrated in FIG. 2. The catalytic purifier forms a generally vertical flow path through conduit 19 suspended within lift compartment 12 by lines 20 from catenary curtain 22 attached to the upper surface of lift compartment 12, and tie-down lines 21.

The catalytic purifier consists of a catalytic converter section 38, where the reaction takes place, a vertical conduit chimney section 19, for inducing flow by thermal convection, a diffuser section 39, for entraining unreacted lift gas to moderate the temperature, a chamber 41 for mixing the entrained gases and outlets 42 for releasing the mixed gas back into lift compartment 12. The catalytic converter section 38 contains inlet flow control means such as adjustable louvres 36 (or dampers 161, FIG. 3) which can be opened to start the process or closed to stop it. When inlet flow control means 36 opens, oxygen in the lift gas diffuses through the oxygen-deficient spent gas in the converter to the catalytic surface where it reacts with hydrogen to form water and liberate heat. The increase in temperature reduces the density starting a thermally-induced draft up the chimney 19 which increases the flow through the catalytic converter. An optional fan or blower may be used to initiate or accelerate this process or to increase the flow rate over what can be achieved by natural convection alone.

The adjustable catalytic screens control the reaction by changes in the number, mesh-size, and contact efficiency of the catalytic surface shown as deployed on a series of screens arranged in the configuration of adjustable louvres. When the objective is complete reaction of the oxygen these screens would be adjusted for maximum contact of the gases with the catalytic surface. When the object is to limit the temperature because of high concentration of reactants oxygen and hydrogen, the louvres supporting the screens can be opened completely thus allowing the gas to largely bypass the catalytic surface and hence reduce the degree of completion of the reaction and effluent temperature.

Diffuser 39, and mixing chamber 41 may also be used to moderate the temperature of the reacted gas. As indicated diffuser 39 forms a venturi to draw cold lift gas into mixing chamber 41 to mix with heated gas from conduit 19 before its release into compartment 12. As particularly shown in FIG. 1, conduit 19 is arranged to extend vertically through lift gas compartment 12 so that it terminates near the upper inner surface of fabric 11. In this way the heated gas from the catalytic reaction of hydrogen and oxygen in purification system 18 may be discharged directly against the inner surface and laterally directed along the upper surface of fabric 11 to deice the outer surface.

Operation of an on-board embodiment of a preferred embodiment of a system to remove both oxygen and nitrogen components from the lift gas is now described with reference to FIGS. 1, 2 and 5.

As noted in FIG. 1, a preferred embodiment of an on-board system may include a catalytic purifier 18 to remove oxygen and a membrane purifier 70 to remove nitrogen and oxygen. In the on-board embodiment, these purifiers would be decoupled allowing each to be operated independently of the other. The passive catalytic purifier, requiring no power except for controls, would be operated continuously to keep the level of oxygen contamination as low as possible. The membrane purifier 70 would therefore be operating on the purified gas containing only trace amounts of oxygen and hence its function would primarily be to remove nitrogen and as discussed above would ordinarily be land-based and not part of an on-board purification system.

The operation of the catalytic purifier 18 has been described above with reference to FIG. 2. The operation of the semi-permeable membrane purifier will now be described with reference to FIG. 5. As there shown, impure lift gas from lift compartment 12 is drawn through lines 63 and 71, and filter 72 by compressor 73. The compressed gas is conditioned by cooler 74, coalescing filters 75 with condensate drains 76, dryer 77, activated carbon adsorber 78 and reheater 79 for passage through a plurality of semi-permeable membrane modules 80A, 80B, 80C and 80D.

In each module a portion of the gas enriched in helium and hydrogen content passes through (permeates) the membrane and exits the modules through ports 84A, B, C and D and enters purified lift gas manifold 82 for return to lift compartment 12 through meter 88 and line 89. Valves 86D, C, B and A in purified lift gas manifold 82 permit separating the permeate from latter stages which may be producing lift gas of less than desired purity for recycling back to the compressor inlet for another pass through the purifier. The residual gas from module 80A passes through modules 80B, 80C and 80D in succession and is finally released to the atmosphere greatly depleted in lift gas and enriched in contaminants through meter 95 and line 96, which for an on-board purifier terminates outside the aerostat. When desired, the residual gas may be diverted by valve 94 through line 97 to temporary storage 98. Periodically, the system may be operated on this stored residual gas for an additional helium recovery.

The residual gas flow rate may be adjusted to permit trade-offs between the compositions of the residual and permeate streams. With the process adjusted to produce a reject residual gas stream richer in contaminants and leaner in helium, the permeate stream will increase in volume but decline in purity. Conversely, with the residual stream volume increased, it will contain more helium and the helium permeate will decrease in volume but increase in purity. The process controls are accordingly adjusted to obtain an economic balance of these opposing desirable objectives of high permeate purity and high helium recovery.

Although in the preferred embodiment of the catalytic purifier the catalyst surface is supported on wire surfaces of screens, the catalyst surface may also be supported on an inert high surface area support such as alumina particles arranged in beds. In either event the catalyst surface is capable of catalyzing the combination of oxygen and hydrogen to form steam (water) with liberation of substantial amounts of heat. As is well-known in the catalytic converter art, many metals, particularly Group VIII metals such as platinum, palladium, rhenium and the like, form suitable catalytic surfaces for the desired oxygen and hydrogen reaction.

In order for catalytic purifier stage 18 to operate properly, gas entering the purifier must contain a catalytically reactable mixture of hydrogen and oxygen. As discussed previously, in the preferred embodiment of the present invention, hydrogen may be present in the lift gas up to about 14% and oxygen is generally present in the lift gas as a contaminant. However there may be instances where oxygen in the lift gas is insufficient to generate the desired amount of heat. In such a situation, and when it is desirable to heat the lift gas to increase its volume and lift capacity or to deice airship surfaces, necessary oxygen, from compressed or liquified storage vessels (not shown), or air may be added to gas entering catalytic converter 38 to form the desired catalytically reactable mixture.

In previously discussed embodiments, hydrogen is preferably maintained in the lift gas up to 14%. In this concentration with helium gas, I have found that such a mixture is non-flammable by flame or spark when mixed with air in any proportion. A particular advantage of maintaining hydrogen in the lift gas is that it facilitates the catalytic reaction of contaminating oxygen for removing the oxygen and for heating the purified lift gas. Furthermore, hydrogen directly increases the lift capacity of the airship, due to hydrogen's higher buoyancy and thereby greatly improves the overall performance of the airships both as to load carrying capacity and performance under adverse weather, for landing and take-off conditions.

Water is also a normal contaminant of the lift gas in airships. Water permeates through the aerostat and ballonet fabrics even faster than hydrogen and helium. When the temperature drops below the dewpoint of the lift gas, water condenses out and drains to low points on the airship where it can be drained off. Thus, airships are normally designed with water drains and the water formed in the catalytic purifier of this invention poses no problems for either the maintenance or operation of an airship.

Although desirable in certain respects, it is not necessary, pursuant to the present purification system, to maintain a particular hydrogen concentration in the lift gas. However, hydrogen is still required to form a catalytically reactable mixture with oxygen in order to operate for the catalytic purifier. Thus where excess hydrogen is not present in the lift compartment, it may be added to lift gas entering the catalytic purifier in approximately stoichiometric proportions to the amount of contaminating oxygen. Hydrogen added in this fashion is then substantially consumed in the reaction with oxygen to form water.

However, where hydrogen is added in approximate stoichiometric proportion, the gas mixture may need to be processed further to facilitate the catalytic reaction. This is particularly true where the nitrogen removal stage precedes the catalytic stage. Under these circumstances, lift gas entering catalytic purifier 18 may be heated or the catalytic surface area increased to augment the catalyzed oxygen/hydrogen reaction.

Another function of the on-board catalytic purifier system is to improve the operational capabilities of the airship by permitting the crew to de-ice the surface of the aerostat with heated lift gas exiting mixing chamber 41.

As mentioned above, airship 10 desirably also includes empennage deicers 23 for preventing accumulation of snow and ice on the fins and control surfaces to assure continued operation of the airship under such icing conditions. As best seen in FIG. 4, each fin member 14 may be equipped with an empennage deicer 23. Lift gas blower 47 draws lift gas containing helium and adequate hydrogen, with contaminating oxygen into inlet 45 from lift compartment 12. Such lift gas then passes over catalytic elements (not shown) in the catalytic converter 49, similar to the elements in catalytic purifier 18, to convert the oxygen and hydrogen components to water and liberate heat. Heat from the reaction then heats the gas leaving the catalytic converter for heat exchange with air in heat exchanger 51 before return to lift compartment 12 through outlet 57. Air blower 53 circulates air from inside or outside fin 14 through heat exchanger 51 into warm air manifold 55 which distributes warm air along the leading edge of fin 14. Warm air then flows through fin 14 to warm its surface and thereby keep it free from accumulation of ice or snow. In addition the heated air may be vented from the trailing edge of fin 14 through vent ports 58 at strategic locations to flow over control surfaces 15, including the pivots or hinges, to perform deicing functions on these elements.

Figure 3A:
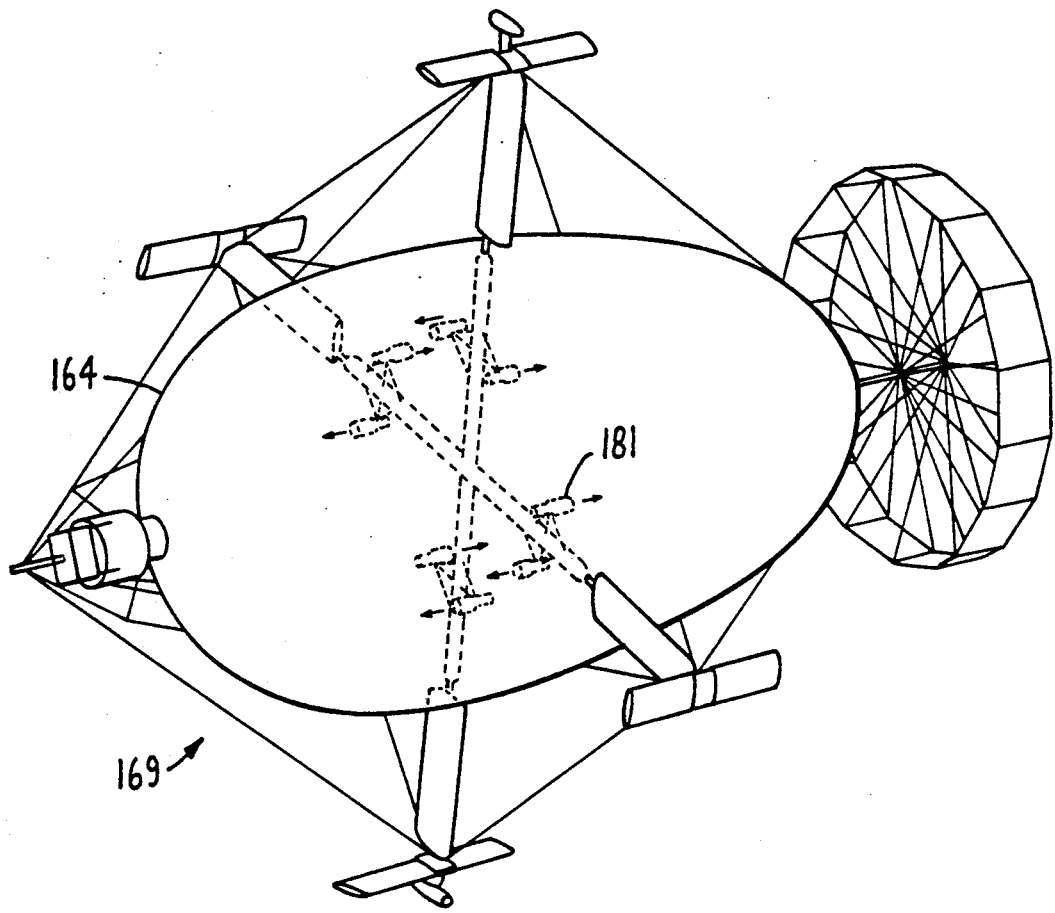
FIG. 3A is a perspective view of an alternative embodiment of a catalytic purification system in a hybrid airship including a rotatably driven lighter-than-air lifting gas compartment.
Figure 3B:
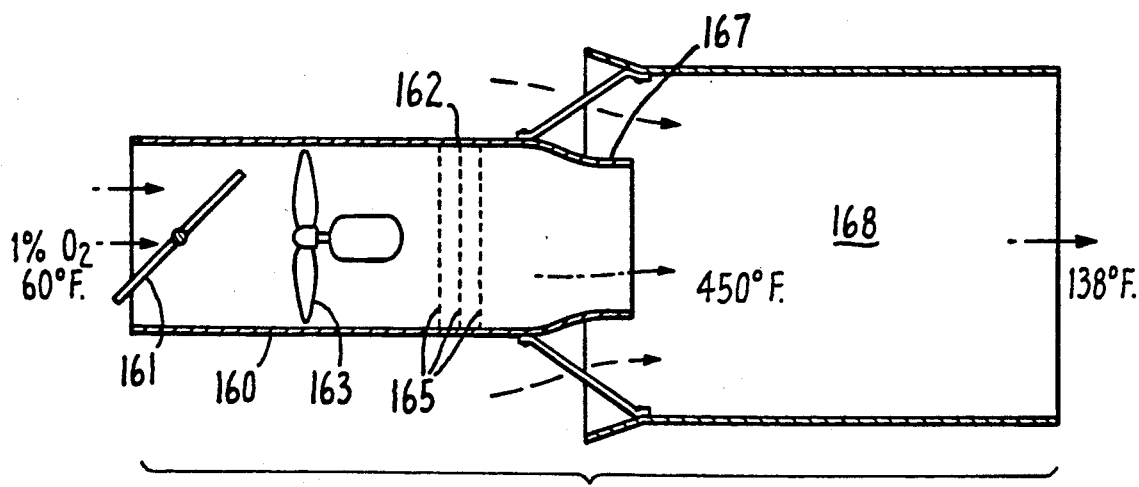
FIG. 3B is a partial sectional view of the embodiment shown in FIG. 3A showing a horizontal arrangement of the catalytic purification system of the present invention.

FIG. 3B illustrates another embodiment of the catalytic purifier 181 wherein gas flow is substantially horizontal. In such a horizontal embodiment, blower 163 draws impure lift gas into purifier 181 through conduit 160, under control of damper 161, or the adjustable louvres 162.

Blower 163 is necessary to move gas through the purifier, since there is no thermal draft, as in the FIG. 2 embodiment. As in the previous embodiment, the catalytic reaction may be controlled either by damper 161 limiting gas flow through conduit 160 or by adjusting the exposed catalyst area or contact efficiency of catalyst screens 165 on louvres 162. Additionally, the catalytic reaction in this embodiment of purifier 181 may be controlled by the speed of blower 163, in response to a gas temperature detector such as a thermocouple (not shown) in the conduit. Diffuser 167 and mixing chamber 168 moderate the temperature of the gases leaving purifier 181 by mixing the hot effluent gases from the catalytic converter with cold unreacted gases from aerostat 164.

The catalytic purifier illustrated in FIG. 3A is particularly useful in a hybrid airship 169, called the "Cyclo-Crane", TM (Aerolift, Inc.) in which the entire lift compartment 164 rotates in flight. Due to rotation of the lift compartment of such an airship the purifier illustrated in FIG. 2 could not remain substantially vertical as in conventional airships but would continuously turn with the lift compartment, thus preventing the purifier from operating properly. By contrast, the horizontal catalytic purifier with blower, as illustrated in FIG. 3B would be substantially unaffected by such rotation.

The semi-permeable membrane modules illustrated in this embodiment preferably include a spiral-wound cellulose acetate membrane element of the type manufactured by the Separex Division of Air Products, Inc. Other types of semi-permeable membranes, such as polysulfone, supported on porous hollow filters, manufactured by Monsanto Corporation, are suitable for such service.

Molecular sieves, such as those manufactured by the Linde division of Union Carbide Corporation, are also satisfactory for such gas separation. Analogous to semi-permeable membranes, sieves are less efficient to remove oxygen than nitrogen. Hence the catalytic converter stage of the present invention removes oxygen that is not efficiently removed by the membranes or sieves for an improved lift gas purification system.

Although nitrogen and a portion of the contaminating oxygen are removed using semi-permeable membranes in a preferred method, the same function can be performed by adsorption on molecular sieves, or zeolites. In the case of absorption on zeolites the process is a cyclic one wherein the zeolite bed absorbs a quantity of contaminants and then must be reactivated by decreasing pressure and allowing the absorbed contaminants to desorb and escape.

A property of almost all semi-permeable membranes described in the technical literature is that the oxygen permeation rate is substantially higher than that of nitrogen. For cellulose acetate membranes the oxygen rate is about five time faster than that of nitrogen. This can be seen from the data in Example 1 taken while purifying a commercial airship using cellulose acetate membranes. While the inlet gas has four times more nitrogen than oxygen the gas passing through the membrane is richer in oxygen than nitrogen.

|  | Example 1 | |
|---|---|---|
|  | Inlet Gas | Permeate |
| Helium | 95 | 99.80 |
| Nitrogen | 4 | 0.09 |
| Oxygen | 1 | 0.11 |
| N/O ratio | 4 | 0.8 |

The present invention thus makes possible essentially complete removal of residual oxygen in the permeate by adding hydrogen in excess of the stoichiometric amount required to combine with the oxygen to form water by passing the mixture over a catalytic surface capable of catalyzing the reaction. Hence, the control parameters of the membrane process can be adjusted solely to optimize helium-nitrogen separation without regard to oxygen because it is removed in the catalytic reaction stage.

The above described preferred embodiments are intended to illustrate the principles of the invention, but not to limit the scope of the invention. Various other embodiments and modifications to these preferred embodiments may be made by those skilled in the art, without departing from the scope of the following claims. All such modifications or changes coming within the scope of the claims are intended to be included.

I claim:

1. A method of at least periodically increasing the lift capacity of a lighter-than-air airship having at least one lift compartment containing helium to provide lift capacity for said airship which comprises,
   inducing flow of a portion of the helium from said lift compartment through a confined path, said helium having a reactable mixture of hydrogen and oxygen components entrained therein, said path having disposed therein for contact by said hydrogen and oxygen components a catalytic reaction surface, the flow of said oxygen and hydrogen components in said mixture over said reaction surface being regulated to control the temperature of the effluent gas passing over said catalytic surface; and circulating the effluent gas into said lift compartment in a volume and at a rate sufficient to maintain or increase the lift capacity of said compartment.

2. A method in accordance with claim 1 wherein the entrained oxygen in said lift compartment helium mixture is reacted with sufficient hydrogen in said mixture to substantially reduce said oxygen component of said effluent gas before circulating it to said compartment.

3. A method in accordance with claim 2 which includes adding sufficient excess hydrogen to said mixture to react substantially all oxygen in said mixture.

4. A method in accordance with claim 3 wherein said effluent gas includes a substantial excess of hydrogen to further increase the lift capacity of said compartment.

5. A method in accordance with claim 1 which includes adding said oxygen and hydrogen components to said helium prior to flow through said confined path.

6. A method in accordance with claim 1 wherein said helium in said lift compartment includes oxygen as a component thereof and said hydrogen component is added thereto during flow of said gas through said confined path.

7. A method in accordance with claim 1 wherein said helium in said compartment includes hydrogen therein and oxygen is added thereto during flow of said gas through said confined path to increase the temperature of said effluent gas.

8. A method in accordance with claim 1 wherein the interior of said lift compartment includes an upper surface adjacent the inner surface of fabric forming the aerostat of said airship and which includes positioning said confined path within said lift compartment of said airship and terminating said confined path adjacent said upper surface of said lift compartment;

reacting said oxygen and hydrogen components in said mixture at a rate sufficient to increase the temperature of the effluent gas so that flow thereof from said confined path is directly against said upper surface of said lift compartment to preferentially increase the temperature of lift gas adjacent thereto by direct mixture of said lift gas with said effluent gas.

9. A method in accordance with claim 8 wherein said lift compartment is formed by the airship aerostat fabric to confine said lift gas therein so that said upper surface of said lift compartment is directly heated by said effluent gas to deter accumulation of ice and snow on the outer surface of said aerostat fabric.

10. A method in accordance with claim 1 which includes varying the efficiency of the contact of said reactable mixture with said catalytic surface in said confined path to control the rate of reaction of oxygen and hydrogen flowing thereover.

11. A method in accordance with claim 1 which includes varying the area of said catalytic surface in said confined path to control the rate of reaction of oxygen and hydrogen flowing thereover.

12. A method in accordance with claim 1 wherein said oxygen component in said lift gas is in the form of contaminating air including a nitrogen component and wherein said nitrogen component of said air is removed prior to reaction of said oxygen and hydrogen components by flow over said catalytic surface in said confined path.

13. A method in accordance with claim 1 wherein said oxygen component in said lift gas is in the form of contaminating air including a nitrogen component, wherein said confined flow path is external to said lift compartment and includes nitrogen and oxygen component removal zones, and wherein said oxygen and hydrogen components are reacted after removal of a preponderance of said nitrogen and oxygen components from said lift gas.

14. A method in accordance with claim 1 wherein hydrogen is added to said mixture at a rate and in an amount to control the effluent gas composition flowing from said confined path so that the resultant lift gas includes hydrogen up to the flammable limit of hydrogen in air.

15. A method in accordance with claim 1 wherein hydrogen is added to said mixture at a rate and in an amount to control the effluent gas composition flowing from said confined path to obtain a hydrogen concentration therein of up to about 14%.

16. A method of at least periodically maintaining the lifting capacity of a lighter-than-air airship by separating oxygen from a helium-oxygen mixture in a lift compartment containing helium as the primary lift gas component for said airship which comprises:

drawing a portion of the helium-oxygen mixture in said lift compartment through a confined flow path, adding to said mixture an amount of hydrogen proportional to the oxygen content of said mixture and at a rate to avoid creating an air flammable mixture of oxygen and hydrogen;

contacting the gaseous mixture of said helium-hydrogen-oxygen in said flow path with a catalytic surface to convert the contacted hydrogen and oxygen components to water; and circulating the effluent gaseous components from said mixture with gas in said lift compartment of said airship.

17. A method in accordance with claim 16 wherein said oxygen-helium mixture in said airship includes nitrogen components and the nitrogen and a preponderance of the oxygen components are separated from said mixture prior to reaction of said oxygen and hydrogen components to water and before circulation of said effluent to said lift compartment.

18. A method in accordance with claim 16 wherein excess hydrogen is added to said helium-oxygen mixture so that said effluent gaseous components form a helium-hydrogen gas mixture having a hydrogen content of up to about 14% on an air-free basis.

19. A method in accordance with claim 16 wherein said confined flow path is within said lift compartment of a lighter-than-air airship, and said flow path extends vertically therethrough to an upper portion of said lift compartment so that said effluent gaseous components, including steam formed by conversion of the hydrogen and oxygen components during flow over said catalytic surface, exhausts against the ceiling of said lift compartment.

20. A method in accordance with claim 19 wherein said effluent gaseous components, are directed generally parallel to the upper surface of said lift compartment to heat the external surface of said lift compartment during mixture with said lift gas.

21. A method of increasing the buoyancy of a helium-filled non-rigid airship, said airship including a gas-tight flexible envelope forming the aerostat thereof and wherein helium and air, respectively form lift gas and ballast compartments to maintain the aerodynamic form of the fabric of said airship aerostat, which comprises:

introducing hydrogen gas into a confined flow path extending generally vertically within the lift gas compartment of said aerostat, said flow path terminating at a level substantially adjacent the inner surface of the flexible covering forming the ceiling of said lift gas compartment of said aerostat;

mixing helium and air from said lift gas compartment with said hydrogen gas to form a catalytically reactable mixture of the hydrogen and oxygen components in said mixture;

flowing the resultant mixture of oxygen-hydrogen-helium over a catalytic surface within said confined flow path at a temperature sufficient to convert a substantial portion of said oxygen and hydrogen components to water vapor and to generate heat in said reacted gases, and then selectively discharging said reacted gases within said lift gas compartment at a rate sufficient to maintain the aerodynamic form of said aerostat and selectively increase the buoyancy of said lift gas therein.

22. A method in accordance with claim 21 wherein the amount of hydrogen is controlled in an amount and to an extent sufficient to additionally heat the external surface of said fabric sufficiently to defrost or deice the aerodynamic surface of said aerostat.

23. A method in accordance with claim 22 wherein at least a portion of said heated gas is additionally discharged against the inner surface of at least one empennage member to defrost or deice said member for controlling the flight of said airship.

24. Apparatus for at least periodically increasing the lift capacity of helium in a lift compartment of a lighter-than-air airship to maintain or augment the lifting capacity of said airship, comprising:

means forming a confined flow path for helium lift gas from said lift compartment or selective mixture with hydrogen and oxygen components to form a gaseous mixture flowing therethrough, said means having disposed therein a hydrogen-oxygen catalytic reaction means for catalytically combining the hydrogen and oxygen components entrained in said mixture;

means for controlling the ratio of the hydrogen and oxygen components to helium in said mixture flowing in said flow path means;

flow inducing means for flowing and mixture from said lift compartment through said confined flow means; and means for returning the purified effluent gas from said flow path means to said lift compartment at a temperature and with a reduced oxygen content of said effluent gas to increase substantially the lift capacity of said helium lift compartment.

25. Apparatus in accordance with claim 24 wherein said ratio control means includes means for adding hydrogen to gas flowing through said confined flow means for reaction with oxygen components in said helium flowing from said lift compartment.

26. Apparatus in accordance with claim 24 wherein said ratio control means includes means for adding oxygen to gas flowing through said confined flow means for reaction with hydrogen components entrained in said helium lift gas flowing from said lift compartment.

27. Apparatus of claim 24 wherein said lift compartment includes an upper surface adjacent or forming the inner surface of the aerostat of a non-rigid airship, and said confined flow path means includes conduit means extending vertically within said lift compartment, said conduit means terminating adjacent said upper surface of said lift compartment so that said effluent gas preferentially increases the temperature of said helium lift gas in said lift compartment adjacent to said inner surface of said aerostat.

28. Apparatus in accordance with claim 24 wherein said catalytic reaction means includes means for varying the surface area of flow path contacted by gas flow thereover to control the rate of reaction of oxygen and hydrogen components of said mixture.

29. Apparatus in accordance with claim 24 wherein said catalytic reaction means includes a plurality of screen members and said screen members are movable into and out of said flow path means.

30. Apparatus in accordance with claim 28 wherein said means for varying the surface area of catalytic reaction means contacted by gas flow includes a plurality of louvres rotatable within said flow path means.

31. Apparatus in accordance with claim 30 wherein at least some of said louvres include screen members.

32. Apparatus in accordance with claim 28 wherein said catalytic reaction means includes a catalytic surface on a high surface area support means.

33. Apparatus in accordance with claim 24 wherein the gaseous mixture includes a nitrogen component flowing in said flow path and said flow path additionally includes nitrogen and oxygen removal means in flow circuit with said confined flow path, means for separating said nitrogen components and a preponderance of said oxygen components from said gas mixture, said nitrogen components being present in said helium with said oxygen components as contaminating air in said lift compartment.

34. Apparatus in accordance with claim 33 wherein said nitrogen and oxygen removal means is located in said flow circuit to remove said nitrogen and oxygen components from said helium lift gas prior to reaction of hydrogen and oxygen components of said mixture by said catalytic reaction means.

35. Apparatus in accordance with claim 33 wherein said nitrogen and oxygen removal means is located in said flow circuit to remove nitrogen components and a preponderance of oxygen components from said helium lift gas after reaction of said oxygen components and hydrogen components of said mixture by said catalytic reaction means.

36. Apparatus in accordance with claim 24 wherein said confined flow path means is external to said lift compartment.

* * * * *